(12) United States Patent
Custodero et al.

(10) Patent No.: US 8,973,634 B2
(45) Date of Patent: Mar. 10, 2015

(54) SELF-ADHESIVE COMPOSITE REINFORCEMENT

(75) Inventors: Emmanuel Custodero, Chamalieres (FR); Sebastien Rigo, Manzat (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 422 days.

(21) Appl. No.: 13/257,824

(22) PCT Filed: Mar. 12, 2010

(86) PCT No.: PCT/EP2010/053155
§ 371 (c)(1),
(2), (4) Date: Feb. 10, 2012

(87) PCT Pub. No.: WO2010/105975
PCT Pub. Date: Sep. 23, 2010

(65) Prior Publication Data
US 2012/0125506 A1 May 24, 2012

(30) Foreign Application Priority Data
Mar. 20, 2009 (FR) .................................. 09 51782

(51) Int. Cl.
*B60C 9/00* (2006.01)
*B29D 30/48* (2006.01)
(Continued)

(52) U.S. Cl.
CPC ............... *B29D 30/48* (2013.01); *B29B 15/08* (2013.01); *B29C 47/0016* (2013.01);
(Continued)

(58) Field of Classification Search
USPC ................................................. 152/451, 450
See application file for complete search history.

(56) References Cited

U.S. PATENT DOCUMENTS 4,754,794 A    7/1988   Bocquet et al.
4,857,128 A *  8/1989   Bocquet et al. .......... 156/244.12
(Continued)

FOREIGN PATENT DOCUMENTS

EP      1 577 121           9/2005
JP      2009279973 A  *  12/2009
(Continued)

OTHER PUBLICATIONS

Dynasol Styrene-Butadiene-Styrene (SBS) Rubber Product Information. Obtained Aug. 27, 2013 at http://www.dynasolelastomers.com/default/index.cfm/product-types/thermoplastic-rubber-styrene-butadiene-styrene-block-copolymer-sbs/.*

*Primary Examiner* — Ling Choi
*Assistant Examiner* — Lanee Reuther
(74) *Attorney, Agent, or Firm* — Cozen O'Connor

(57) ABSTRACT

Composite reinforcement (R-2) that is self-adhesive by curing to a diene rubber matrix, which can be used as reinforcing element for a tire, comprising: at least one reinforcing thread (20), for example a carbon steel cord; a first layer (21) of a thermoplastic polymer, the glass transition temperature of which is positive, for example 6,6 polyamide, covering said thread; and a second layer (22) comprising an unsaturated thermoplastic stirene elastomer, the glass transition temperature of which is negative, for example an SBS (stirene-butadiene-stirene) copolymer, covering the first layer (21). Process for manufacturing such a composite reinforcement and rubber article or semi-finished product, especially a tire, incorporating such a composite reinforcement.

27 Claims, 3 Drawing Sheets

(51) Int. Cl.

| | |
|---|---|
| *B29B 15/08* | (2006.01) |
| *B29C 47/00* | (2006.01) |
| *B29C 47/02* | (2006.01) |
| *B29C 70/16* | (2006.01) |
| *B29D 30/38* | (2006.01) |
| *D07B 1/06* | (2006.01) |
| *B29K 9/06* | (2006.01) |
| *B29K 77/00* | (2006.01) |
| *C08L 77/00* | (2006.01) |
| *C08L 77/06* | (2006.01) |

(52) U.S. Cl.
CPC .............. B29C 47/025 (2013.01); B29C 70/16 (2013.01); B29D 30/38 (2013.01); B60C 9/0007 (2013.01); B60C 9/0042 (2013.01); *D07B 1/0666* (2013.01); *B29D 2030/383* (2013.01); *B29D 2030/483* (2013.01); *B29K 2009/06* (2013.01); *B29K 2077/00* (2013.01); *C08L 77/00* (2013.01); *C08L 77/06* (2013.01); *D07B 2201/2012* (2013.01); *D07B 2201/2013* (2013.01); *D07B 2201/2044* (2013.01); *D07B 2201/2045* (2013.01); *D07B 2201/2046* (2013.01); *D07B 2205/2003* (2013.01); *D07B 2205/2082* (2013.01)

USPC ....................................................... 152/451

(56) References Cited

U.S. PATENT DOCUMENTS

| | | | |
|---|---|---|---|
| 5,702,548 | A | 12/1997 | Arnaud et al. |
| 6,346,325 | B1 | 2/2002 | Edwards et al. |
| 8,281,837 | B2 * | 10/2012 | Hashimoto et al. ........... 152/533 |
| 2006/0147731 | A1 | 7/2006 | Grimberg et al. |
| 2010/0032070 | A1 * | 2/2010 | Albert et al. .................. 152/504 |

FOREIGN PATENT DOCUMENTS

| | | |
|---|---|---|
| WO | WO 01/87577 | 11/2001 |
| WO | WO 03/066353 | 8/2003 |
| WO | WO 2008080556 A1 * | 7/2008 |

* cited by examiner

SELF-ADHESIVE COMPOSITE REINFORCEMENT

RELATED APPLICATION

This is a U.S. National Phase Application under 35 USC 371 of International Application PCT/EP2010/053155 filed on Mar. 12, 2010.

This application claims the priority of French patent application no. 09/51782 filed Mar. 20, 2009, the entire content of which is hereby incorporated by reference.

FIELD OF THE INVENTION

The field of the present invention is that of reinforcing elements or reinforcements, notably metallic ones, which can be used to reinforce diene rubber articles or semi-finished products such as, for example, pneumatic tires.

The present invention relates more particularly to reinforcements of the hybrid or composite type that consist of at least one core, in particular a metal core, said core being sheathed or covered by one or more layers of a thermoplastic material.

BACKGROUND OF THE INVENTION

The sheathing of metallic reinforcements with thermoplastic materials, such as for example a polyamide or polyester, has been known for a very long time, especially so as to protect these reinforcements from various types of external attack such as oxidation or abrasion, or else for the purpose of structurally stiffening, by bonding them together, various groups of threads or thread assemblies such as cords, and thus increasing particularly their buckling resistance.

Such composite reinforcements, together with their use in rubber articles such as pneumatic tires, have been described in many patent documents.

Patent application EP 0 962 576 has for example described a reinforcement, made of steel or aramid textile, sheathed by a thermoplastic material such as a polyester or polyamide, for the purpose of improving its abrasion resistance.

Patent application FR 2 601 293 has described the sheathing of a metal cord with a polyamide so as to use it as a bead wire in a pneumatic tire bead, this sheathing advantageously enabling the shape of this bead wire to adapt to the structure and to the operating conditions of the bead of the tire that it reinforces.

Patent documents FR 2 576 247 and U.S. Pat. No. 4,754,794 have also described metal cords or threads that can be used as a bead wire in a tire bead, these threads or cords being doubly-sheathed or even triply-sheathed by two or even three different thermoplastic materials (e.g. polyamides) having different melting points, with the purpose, on the one hand, of controlling the distance between these threads or cords and, on the other hand, of eliminating the risk of wear by rubbing or of corrosion, in order to use them as a bead wire in a pneumatic tire bead.

These reinforcements thus sheathed with a polyester or polyamide material have, apart from the aforementioned advantages of corrosion resistance, abrasion resistance and structural rigidity, the not insignificant advantage of them being able to be subsequently bonded to diene rubber matrices using simple textile adhesives called RFL (resorcinol-formaldehyde-latex) adhesives comprising at least one diene elastomer, such as natural rubber, which adhesives are known to provide satisfactory adhesion between textile fibres, such as polyester or polyamide fibres, and a diene rubber.

Thus, it may be advantageous to use metal reinforcements not coated with adhesive metal layers, such as with brass, and also surrounding rubber matrices containing no metal salts, such as cobalt salts, which are necessary as is known for maintaining the adhesive properties over the course of time but which significantly increase, on the one hand, the cost of the rubber matrices themselves and, on the other hand, their oxidation and aging sensitivity (see for example the patent application WO 2005/113666).

However, the above RFL adhesives are not without drawbacks: in particular they contain as base substance formaldehyde, a substance which it is desirable long-term to eliminate from adhesive compositions because of the recent changes in European regulations regarding this type of product.

Thus, designers of diene rubber articles, especially tire manufacturers, are presently seeking new adhesive systems or new reinforcements that enable all or some of the aforementioned drawbacks to be alleviated.

BRIEF DESCRIPTION OF THE INVENTION

One object of the invention is to provide a novel composite reinforcement which requires no sizing treatment in order to adhere to rubber, in a certain sense of the type self-adhesive by curing, and which consequently enables the above objective to be achieved.

One aspect of the invention is directed to a composite reinforcement comprising:
  at least one reinforcing thread;
  a first layer of a thermoplastic polymer, the glass transition temperature of which is positive, covering said thread; and
  a second layer comprising an unsaturated thermoplastic stirene elastomer, the glass transition temperature of which is negative, covering the first layer.

Unexpectedly, it has been found that the presence of this unsaturated thermoplastic stirene elastomer makes it possible to ensure that the composite reinforcement of the invention adheres directly and strongly to a diene elastomer matrix or composition such as those widely used in tires.

Another aspect of the invention is directed to a process for manufacturing the above composite reinforcement, said process comprising at least the following steps:
  the reinforcing thread is covered by a layer of the thermoplastic polymer having a positive glass transition temperature;
  a second layer comprising the unsaturated thermoplastic stirene elastomer, having a negative glass transition temperature, is deposited on the thread thus covered; and
  the assembly undergoes a thermo-oxidative treatment in order to bond the two layers together.

A composite reinforcement according to an embodiment of the invention can be used as a reinforcing element for rubber articles or semi-finished products, particularly tires, especially those intended to be fitted onto motor vehicles of the passenger type, SUVs ("Sport Utility Vehicles"), two-wheel vehicles (especially bicycles and motorcycles), aircraft, or industrial vehicles chosen from vans, "heavy" vehicles, i.e. underground trains, buses, road transport vehicles (lorries, tractors, trailers), off-road vehicles, such as agricultural or civil engineering machines, and other transport or handling vehicles.

Another aspect of the invention relates to any rubber article or semi-finished product, in particular a tire, that includes a composite reinforcement according to the invention.

DETAILED DESCRIPTION OF THE DRAWINGS

Figure 1:
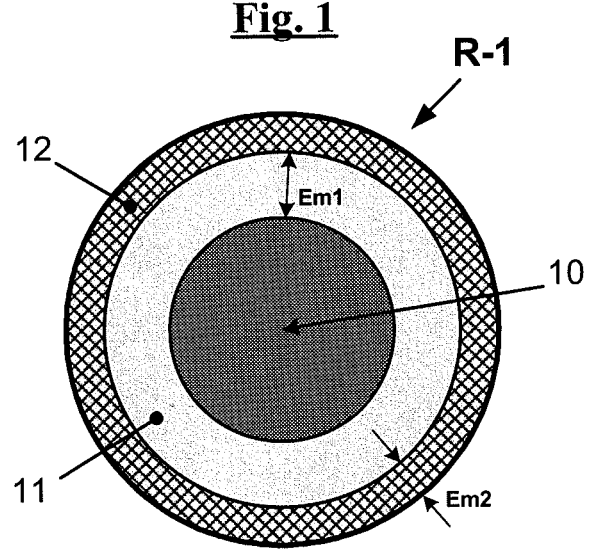
FIG. 1 shows, in cross section, an example of a composite reinforcement according to the invention.

In the present description, unless expressly indicated otherwise, all the percentages (%) indicated are % by weight.

Moreover, any range of values denoted by the expression "between a and b" represents the range of values starting from more than a to less than b (i.e. with the limits a and b excluded), whereas any range of values denoted by the expression "from a to b" means the range of values starting from a and going up to b (i.e. including the strict limits a and b).

The composite reinforcement of the invention, capable of adhering directly to an unsaturated rubber composition and able to be used in particular for reinforcing diene rubber articles, such as tires, therefore has the feature of comprising:
  at least one reinforcing thread (i.e. one or more reinforcing threads);
  a first layer of a thermoplastic polymer, the glass transition temperature (denoted hereafter by $Tg_1$) of which is positive (i.e. above 0° C.), covering said thread (or said threads); and
  a second layer of a thermoplastic stirene (TPS) elastomer of the unsaturated type, the glass transition temperature (denoted hereafter by $Tg_2$) of which is negative (i.e. below 0° C.), covering said first layer.

In other words, the composite reinforcement of the invention comprises a single reinforcing yarn or several reinforcing yarns, each reinforcing yarn being covered by two different superposed layers of thermoplastic polymers. The structure of the reinforcement of the invention is described in detail below.

In the present application, the term "reinforcing thread" is understood in general to mean any elongate element of great length relative to its cross section, whatever the shape, for example circular, oblong, rectangular, square, or even flat, of this cross section, it being possible for this thread to be straight or not straight, for example twisted or wavy.

This reinforcing thread may take any known form. For example, it may be an individual monofilament of large diameter (for example and preferably equal to or greater than 50 µm), an individual ribbon, a multifilament fibre (consisting of a plurality of individual filaments of small diameter, typically less than 30 µm), a textile folded yarn formed from several fibres twisted together, a textile or metal cord formed from several fibres or monofilaments cabled or twisted together, or else a band or strip comprising several of these monofilaments, fibres, folded yarns or cords grouped together, for example aligned along a main direction, whether straight or not.

The or each reinforcing thread has a diameter preferably smaller than 5 mm, especially in the range from 0.1 to 2 mm.

Preferably, the reinforcing thread is a metal reinforcing thread, especially a carbon steel wire such as those used in steel cords for tires. However, it is of course possible to use other types of steel, for example stainless steel. When a carbon steel is used, its carbon content is preferably between 0.4% and 1.2%, especially between 0.5% and 1.1%. The invention applies in particular to any steel of the steel cord type having a standard or NT ("Normal Tensile") strength, a high or HT ("High Tensile") strength, a very high or SHT ("Super High Tensile") strength or an ultra-high or UHT ("Ultra High Tensile") strength.

The steel could be coated with an adhesive layer, such as a layer of brass or zinc. However, advantageously a bright, i.e. uncoated, steel may be used. Furthermore, by virtue of the invention, the rubber composition intended to be reinforced by a metal reinforcement according to the invention no longer requires the use in its formulation of metal salts such as cobalt salts.

The first layer or sheath covering the or each reinforcing yarn is formed by a thermoplastic polymer having by definition a positive Tg ($Tg_1$), preferably above +20° C. and more preferably above +30° C. Moreover, the melting point (Tm) of this thermoplastic polymer is preferably above 100° C., more preferably above 150° C. and especially above 200° C.

This thermoplastic polymer is preferably chosen within the group consisting of polyamides, polyesters and polyimides, more particularly from the group formed by aliphatic polyamides and polyesters. Among polyesters, mention may for example be made of PET (polyethylene terephthalate), PEN (polyethylene naphthalate), PBT (polybutylene terephthalate), PBN (polybutylene naphthalate), PPT (polypropylene terephthalate), and PPN (polypropylene naphthalate). Among aliphatic polyamides, mention may in particular be made of the polyamides 4,6, 6, 6,6, 11 and 12. This thermoplastic polymer is preferably an aliphatic polyamide, more preferably a 6,6 polyamide.

The second layer or sheath covering the first layer is formed by an unsaturated thermoplastic stirene elastomer having by definition a negative Tg ($Tg_2$), preferably below −20° C. and more preferably below −30° C. Thus, and according to a preferred embodiment of the invention, the difference in glass transition temperatures ($Tg_1$-$Tg_2$) between the thermoplastic polymer and the unsaturated TPS elastomer is greater than 40° C., more preferably greater than 60° C.

It will be recalled here that TPS (thermoplastic stirene) elastomers are thermoplastic elastomers in the form of stirene-based block copolymers. These thermoplastic elastomers, having an intermediate structure between thermoplastic polymers and elastomers, are made up, as is known, from polystyrene hard sequences linked by elastomer soft sequences, for example polybutadiene, polyisoprene or poly(ethylene/butylene) sequences.

This is why, as is known, TPS copolymers are generally characterized by the presence of two glass transition peaks, the first (lower, negative temperature, corresponding to $Tg_2$) peak relating to the elastomer block of the TPS copolymer while the second (higher, positive temperature, typically at around 80° C.) peak relating to the thermoplastic (stirene block) part of the TPS copolymer.

These TPS elastomers are often tri-block elastomers with two hard segments linked by a soft segment. The hard and soft segments may be arranged in a linear fashion, or in a star or branched configuration. These TPS elastomers may also be di-block elastomers with a single hard segment linked to a soft segment. Typically, each of these segments or blocks contains a minimum of more than 5, generally more than 10, base units (for example stirene units and isoprene units in the case of a stirene/isoprene/stirene block copolymer).

This being reminded, one essential feature of the TPS elastomer used in the composite reinforcement of the invention is the fact that it is unsaturated. By the expression "TPS elastomer" is understood by definition, and as is well known, a TPS elastomer that contains ethylenically unsaturated groups, i.e. it contains carbon-carbon double bonds (whether conjugated or not). Conversely, a saturated TPS elastomer is of course a TPS elastomer that contains no such double bonds.

Preferably, the unsaturated elastomer is a copolymer comprising stirene (i.e. polystirene) blocks and diene (i.e. polydiene) blocks, especially isoprene (polyisoprene) or butadiene (polybutadiene) blocks. Such an elastomer is chosen in particular within the group consisting of stirene/butadiene (SB), stirene/isoprene (SI), stirene/butadiene/butylene (SBB), stirene/ butadiene/isoprene (SBI), stirene/butadiene/stirene (SBS), stirene/butadiene/butylene/ stirene (SBBS), stirene/isoprene/stirene (SIS), stirene/butadiene/isoprene/stirene (SBIS) block copolymers and blends of these copolymers.

More preferably, this unsaturated elastomer is a copolymer of the tri-block type, chosen within the group consisting of stirene/butadiene/stirene (SBS), stirene/butadiene/butylene/ stirene (SBBS), stirene/isoprene/stirene (SIS), stirene/butadiene/isoprene/stirene (SBIS) block copolymers and blends of these copolymers.

According to another preferred embodiment of the invention, the stirene content in the unsaturated TPS elastomer is between 5 and 50%. Outside the range indicated, there is a risk of the intended technical effect, namely an adhesion compromise with respect, on the one hand, to the layer of the thermoplastic polymer and, on the other hand, to the diene elastomer to which the reinforcement is moreover intended, no longer being optimal. For these reasons, the stirene content is more preferably between 10 and 40%.

The number-average molecular weight ($M_n$) of the TPS elastomer is preferably between 5000 and 500,000 g/mol, more preferably between 7000 and 450,000. The number-average molecular weight ($M_n$) of the TPS elastomers is determined, in a known manner, by SEC (steric exclusion chromatography). The specimen is firstly dissolved in tetrahydrofuran with a concentration of about 1 g/l and then the solution is filtered on a filter of 0.45 µm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS "STYRAGEL" columns (an HMW7 column, an HMW6E column and two HT6E columns) are used in series. The injected volume of the polymer specimen solution is 100 µl. The detector is a WATERS 2410 differential refractometer and its associated software, for handling the chromatograph data, is the WATERS MILLENIUM system. The calculated average molecular weights are relative to a calibration curve obtained with polystirene standards.

Unsaturated TPS elastomers, such as for example SBS, SBBS, SIS or SBIS, are well known and commercially available, for example from the company Kraton under the name "Kraton D" (e.g. the products D1161, D1118, D1116, D1163 in the case of SIS and SBS elastomers), from the company Dynasol under the name "Calprene" (e.g. the products C405, C411 and C412 in the case of SBS elastomers) or else from the company Asahi under the name "Tuftec" (e.g. the product P1500 in the case of an SBBS elastomer).

The glass transition temperature of the above thermoplastic polymers ($Tg_1$ and $Tg_2$) is measured, in a known manner, by DSC (Differential Scanning calorimetry), for example and except different indications specified in the present application, according to the ASTM D3418 (1999) Standard.

FIG. 1 appended hereto shows very schematically (without being drawn to a specific scale), in cross section, a first example of a composite reinforcement according to the invention. This composite reinforcement denoted by R-1 consists of a reinforcing thread (10) consisting of a unitary filament or monofilament having a relatively large diameter (for example between 0.10 and 0.50 mm), for example made of carbon steel, which is covered with a first layer (11) of a thermoplastic polymer having a positive glass transition temperature ($Tg_1$), for example made of a polyamide or a polyester, the minimum thickness of which is denoted by $E_{m1}$ in FIG. 1. A second layer (12) of an unsaturated TPS elastomer, for example SBS, SBBS, SIS or SBIS, having a negative glass transition temperature ($Tg_2$), covers the first layer (11) and a has a minimum thickness denoted by $E_{m2}$ in FIG. 1.

Figure 2:
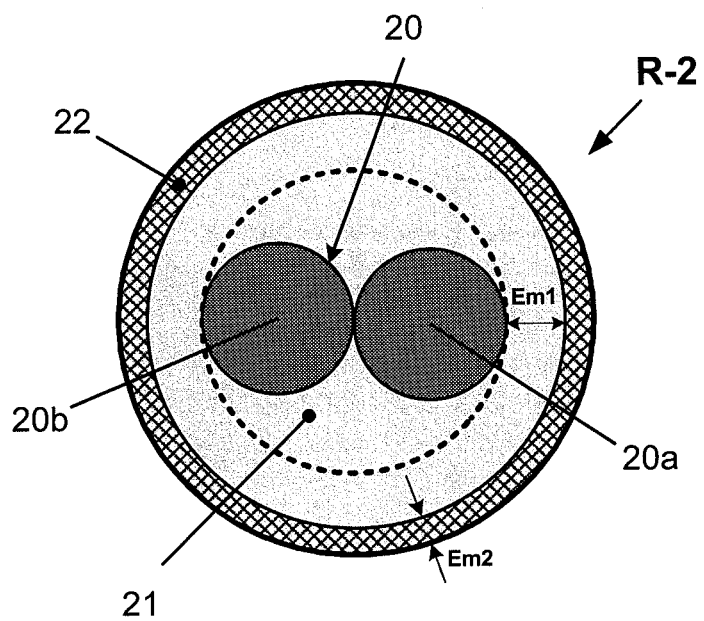
FIG. 2 shows, in cross section, another example of a reinforcement according to an embodiment of the invention.

FIG. 2 shows schematically, in cross section, a second example of a composite reinforcement according to the invention. This composite reinforcement denoted R-2 consists of a reinforcing thread (20) consisting in fact of two unitary filaments or monofilaments (20a, 20b) of relatively large diameter (for example between 0.10 and 0.50 mm) twisted or cabled together, for example made of carbon steel. The reinforcing thread (20) is covered in a first layer (21) of a thermoplastic polymer having a positive glass transition temperature ($Tg_1$), for example made of 6,6 polyamide or a polyester, with a minimum thickness $E_{m1}$. A second layer (22) of an unsaturated TPS elastomer, for example SBS or SIS, having a negative glass transition temperature ($Tg_2$), with a minimum thickness of $E_{m2}$ covers the first layer (21).

Figure 3:
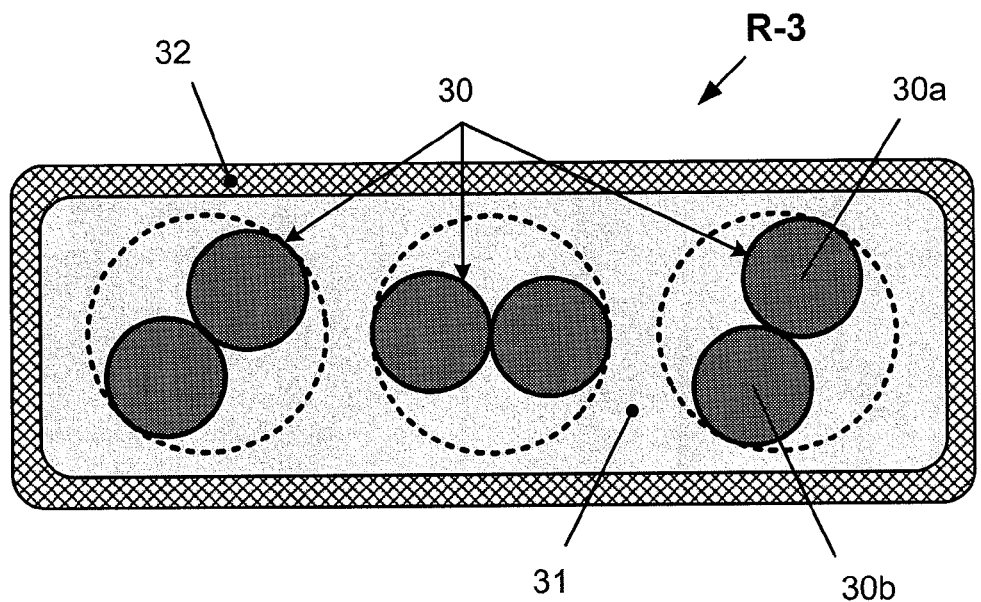
FIG. 3 shows, in cross section, another example of a reinforcement according to an embodiment of the invention.

FIG. 3 shows schematically, in cross section, another example of a composite reinforcement according to the invention. This composite reinforcement denoted by R-3 consists of three reinforcing threads (30) each consisting of two monofilaments (30a, 30b) of relatively large diameter (for example between 0.10 and 0.50 mm) twisted or cabled together, for example made or steel or carbon. The assembly formed by for example the three aligned reinforcing threads (30) is covered with a first layer (31) of a thermoplastic polymer having a positive glass transition temperature ($Tg_1$), for example a polyamide or a polyester. A second layer (32) of an unsaturated TPS elastomer, for example SBS, SBBS, SIS or SBIS, having a negative glass transition temperature ($Tg_2$) covers the first layer (31).

Figure 4:
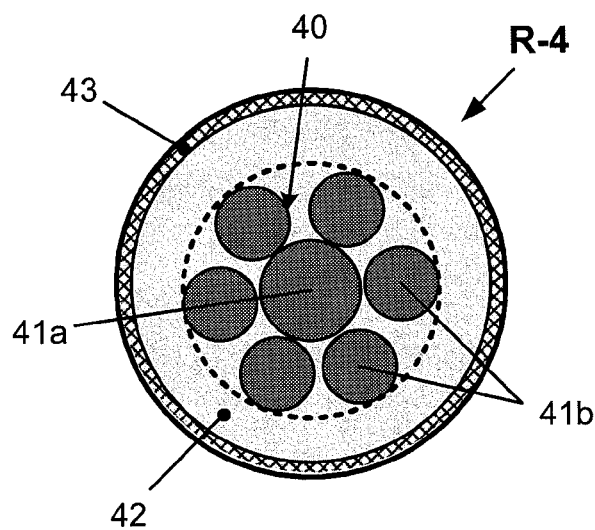
FIG. 4 shows, in cross section, another example of a reinforcement according to an embodiment of the invention.

FIG. 4 shows schematically, again in cross section, another example of a composite reinforcement according to the invention. This composite reinforcement R-4 comprises a reinforcing thread (40) consisting of a steel cord of 1+6 construction, with a central wire or core wire (41a) and six filaments (41b) of the same diameter that are wound together in a helix around the central wire. This reinforcing thread or cord (40) is covered with a first layer (42) of a 6,6 polyamide which is itself covered with a second layer (43) of an SBS elastomer.

In the composite reinforcements according to the invention, such as those shown schematically for example in the aforementioned FIGS. 1 to 4, the minimum thickness of the two layers ($E_{m1}$ and $E_{m2}$) may vary very widely depending on the particular production conditions of the invention.

The minimum thickness $E_{m1}$ of the first layer is preferably between 1 µm and 2 mm, more preferably between 10 µm and 1 mm.

According to particular embodiments of the invention, the minimum thickness $E_{m2}$ of the second layer may be of the same order of magnitude as that of the first layer (in the case of a thick second layer with a thickness for example between 1 µm and 2 mm, in particular between 10 µm and 1 mm), or else may be appreciably different.

According to another particular embodiment, the second layer could for example be formed by a thin or ultra-thin adhesive layer deposited, for example, not by extrusion but by a coating or spraying technique, or another thin or ultra-thin deposition technique, for example with a thickness between 0.02 μm and 1 μm, in particular between 0.05 μm and 0.5 μm.

If several reinforcing threads are used, the first and second layers may be deposited individually on each of the reinforcing threads (as a reminder, these reinforcing threads may or may not be unitary), as illustrated for example in FIGS. 1, 2 and 4 commented upon above. However, the first and second layers may also be deposited collectively on several reinforcing threads appropriately arranged, for example aligned along a main direction, as illustrated for example in FIG. 3.

The composite reinforcement of the invention is produced by a specific process comprising at least the following steps:

during a first step, initially at least one reinforcing thread is firstly covered by the first layer of thermoplastic polymer having a positive glass transition temperature;

next, during a second step, a second layer of the unsaturated TPS elastomer, having a negative glass transition temperature, is deposited on the reinforcing thread(s) thus covered; and finally, the assembly is subjected to a thermo-oxidative treatment in order to bond the two layers together.

The first two steps are carried out, in a manner known to those skilled in the art, continuously in line or otherwise. For example, these steps simply consist in making the reinforcing thread pass through dies of suitable diameter in extrusion heads heated to appropriate temperatures.

According to a preferred embodiment, the reinforcing thread or threads are preheated, for example by induction heating or by IR radiation, before passing into the respective extrusion heads. On exiting each extrusion head, the reinforcing thread or threads thus sheathed are then cooled sufficiently for the respective polymer layer to solidify, for example using cold air or another gas, or by the thread(s) passing through a water bath followed by a drying step.

The next step consists of a thermo-oxidative treatment. The term "thermo-oxidative treatment" is understood by definition to mean a heat treatment in the presence of oxygen, for example the oxygen in the air. Without a thermo-oxidative treatment, it has proved impossible to obtain acceptable adhesion of the TPS second layer to the thermoplastic polymer first layer—a vacuum heat treatment for example has proved to be completely ineffective.

As an example, a reinforcing thread with a diameter of about 0.6 mm, for example a metal cord consisting simply of two individual monofilaments of 0.3 mm diameter twisted together (as for example illustrated in FIG. 2) is covered with a 6,6 polyamide first layer having a maximum thickness equal to about 0.4 mm, in order to obtain a sheathed reinforcing thread having a total diameter of about 1 mm, on an extrusion/sheathing line comprising two dies, a first die (counter-die or upstream die) having a diameter equal to about 0.65 mm and a second die (or downstream die) having a diameter equal to about 0.95 mm, both dies being placed in an extrusion head heated to about 300° C. The polyamide, which melts at a temperature of 290° C. in the extruder, thus covers the reinforcing thread on passing through the sheathing head, at a thread run speed typically several tens of m/min for an extrusion pump rate typically of several tens of cm³/min. On exiting this first sheathing die, the thread may be immersed in a cooling tank filled with cold water, in order for the polyamide to solidify and set in its amorphous state, and then dry, for example by heating the take-up reel in an oven.

The thread thus covered with polyamide is then covered with the unsaturated TPS elastomer, according to one embodiment adapted to the intended thickness for the second layer.

As a first example, if the intended thickness of the second layer is about 0.1 mm, the thread covered with 6,6 polyamide may be passed back through an extrusion-sheathing line in which the sheathing head is heated to a temperature of 200° C. and fitted with a first counter-die 1.1 mm in diameter and a second die 1.2 mm in diameter. The unsaturated TPS elastomer, heated for example to a temperature of about 180° C. in the extruder, thus covers the thread, by passing through the sheathing head, typically at a run speed of a few m/min to a few tens of m/min for an extrusion pump throughput typically of a few cm³/min to a few tens of cm³/min.

As a second example, if the intended thickness of the second layer is very substantially smaller, for example equal to a few tens of a nanometre, the thread covered with 6,6 polyamide passes, for example at a speed of a few m/min or tens of m/min, and over a length of several cm or tens of cm, between two wool baize elements pressed by a mass of 1 kg and continuously imbibed with the TPS elastomer diluted in an appropriate solvent (for example SBS diluted to 5% in toluene), so as in this way to cover all of it with an ultra-thin layer of TPS elastomer (SBS).

For the two successive sheathing steps described above, the cord (reinforcing thread) is advantageously preheated, for example by passing through an HF generator or through a heating tunnel, before passing into the extrusion heads.

After the second operation, i.e. directly on leaving heating head or the coating bath that were described above, depending on the particular embodiments of the invention, the composite thread passes through a tunnel oven, for example several metres in length, in order to undergo therein a heat treatment in air.

The treatment temperature is for example between 150° C. and 300° C., for treatment times of a few seconds to a few minutes depending on the case, it being understood that the duration of the treatment will be shorter the higher the temperature and that the heat treatment necessarily must not lead to the thermoplastic materials used remelting or even excessively softening.

The composite reinforcement of the invention thus completed is advantageously cooled, for example in air, so as to avoid undesirable sticking problems while it is being wound onto the final take-up reel.

A person skilled in the art will know how to adjust the temperature and the duration of the treatment according to the particular operating conditions of the invention, especially according to the exact nature of the composite reinforcement manufactured, particularly according to whether the treatment is on monofilaments taken individually, cords consisting of several monofilaments or groups of such monofilaments or cords, such as strips.

In particular, a person skilled in the art will have the advantage of varying the treatment temperature and treatment time so as to find, by successive approximations, the operating conditions giving the best adhesion results for each particular embodiment of the invention.

The steps of the process according to the invention that have been described above may advantageously be supplemented with a final treatment for three-dimensionally crosslinking the reinforcement, more precisely its TPS elastomer second layer, in order to further increase the intrinsic cohesion thereof, especially if this composite reinforcement is intended for being eventually used at a relatively high temperature, typically above 100° C.

This crosslinking may be carried out by any known means, for example by physical crosslinking means such as ion or electron bombardment, or by chemical crosslinking means, for example by incorporating a crosslinking agent (e.g. linseed oil) into the TPS elastomer, for example while it is being extruded, or else by incorporating a vulcanizing (i.e. sulphur-based) system into the TPS elastomer.

Crosslinking may also take place, while the tires (or more generally rubber articles) that the composite reinforcement of the invention is intended to reinforce, by means of the intrinsic crosslinking system present in the diene rubber compositions used for making such tires (or articles) and coming into contact with the composite reinforcement of the invention.

The composite reinforcement of the invention can be used directly, that is to say without requiring any additional adhesive system, as reinforcing element for a diene rubber matrix, for example in a tire. Advantageously, it may be used to reinforce tires for all types of vehicle, in particular for passenger vehicles or industrial vehicles such as heavy vehicles.

Figure 5:
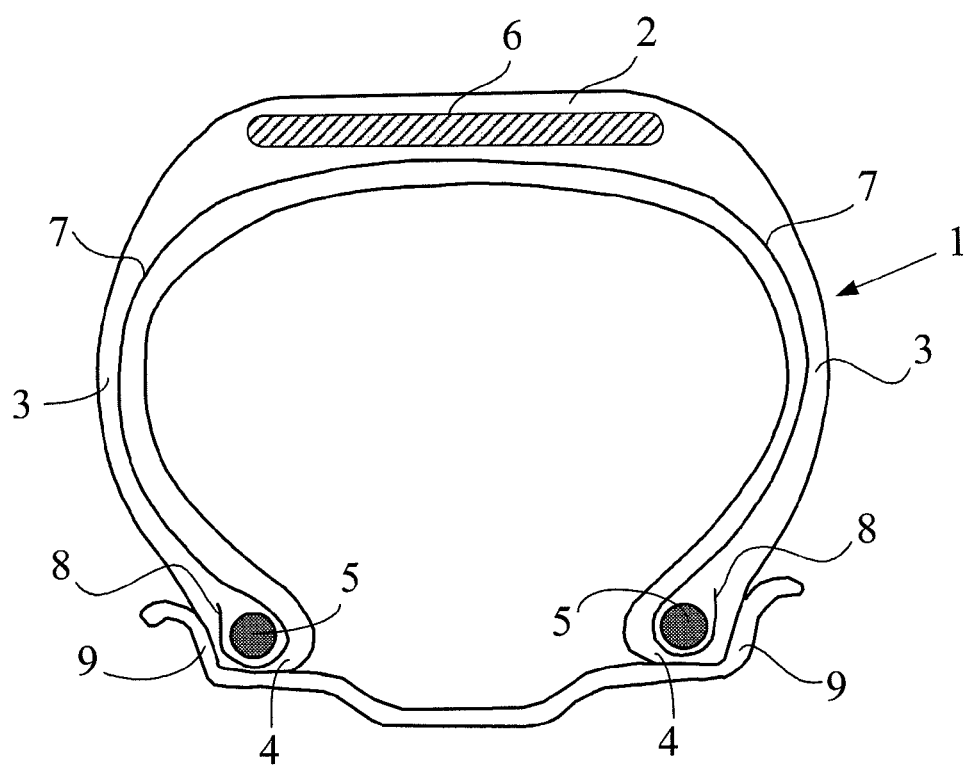
FIG. 5 shows, in radial section, a tire having a radial carcass reinforcing member, in accordance with the invention, incorporating a composite reinforcement according to an embodiment of the invention.

As an example, FIG. 5 appended hereto shows very schematically (without being drawn to a specific scale) a radial section through a tire according to the invention for a passenger vehicle.

This tire 1 comprises a crown 2 reinforced by a crown reinforcement or belt 6, two sidewalls 3 and two beads 4, each of these beads 4 being reinforced with a bead wire 5. The crown 2 is surmounted by a tread (not shown in this schematic figure). A carcass reinforcement 7 is wound around the two bead wires 5 in each bead 4, the upturn 8 of this reinforcement 7 lying for example towards the outside of the tire 1, which here is shown fitted onto its rim 9. The carcass reinforcement 7 consists, as is known per se of at least one ply reinforced by cords, called "radial" cords, for example textile or metal cords, that is to say that these cords are arranged practically parallel to one another and extend from one bead to the other so as to make an angle of between 80° and 90° with the median circumferential plane (the plane perpendicular to the rotation axis of the tire, which is located at mid-distance from the two beads 4 and passes through the middle of the crown reinforcement 6).

This tire 1 of the invention has for example the essential feature that at least one of the crown or carcass reinforcements thereof comprises a composite reinforcement according to the invention. According to another possible embodiment of the invention, it is the bead wires 5 that could be made from a composite reinforcement according to the invention.

EMBODIMENT OF THE INVENTION

Trial 1—Composite Reinforcement Manufacture

Composite reinforcements, according to or not according to the invention, were firstly manufactured in the following manner. The starting reinforcing thread was a steel cord for tires, made of standard steel (having a carbon content of 0.7% by weight), in 1×2 construction consisting of two individual threads or monofilaments 0.30 mm in diameter twisted together with a helix pitch of 10 mm. Cord diameter was 0.6 mm.

This cord was covered with 6,6 polyamide (ZYTEL E40 NC010 from the company DuPont de Nemours; melting point $T_m$ equal to about 260° C.) was performed on an extrusion-sheathing line by passing it through an extrusion head heated to a temperature of 300° C. and comprising two dies—an upstream die 0.63 mm in diameter and a downstream die 0.92 mm in diameter. The polyamide heated to a temperature of about 290° C. in the extruder (pump rate of 20 cm³/min) thus covered the thread (preheated to about 280-290° C. by passing it through an HF generator) running at a speed of 30 m/min. On leaving the sheathing head, the composite reinforcement obtained was continuously run through a cooling tank filled with water at 5° C., in order for the polyamide to solidify in its amorphous state, before being dried using an air nozzle.

This stage of the manufacture resulting in a control composite reinforcement (therefore not in accordance with the invention) consisting of the initial steel cord sheathed only with its polyamide first layer. This control composite reinforcement (denoted by R-5) had a total diameter (i.e. once sheathed) of about 1.0 mm.

Next, during a second step, a second layer of an SBS thermoplastic elastomer (D1118 from the company Kraton), the intended minimum thickness ($E_{m2}$) of which about 0.1 mm, was deposited on the cord thus sheathed in the following manner: the cord covered with 6,6 polyamide (preheated to about 100° C. by passing it through a heating tunnel) was passed back through a second extrusion-sheathing line in which the sheathing head was heated to a temperature of 200° C. and fitted with an upstream die 1.1 mm in diameter and with a downstream die 1.2 mm in diameter. The SBS elastomer, heated to a temperature of 180° C. in the extruder, thus covered the cord, by passing through the sheathing head (pump rate: 2 cm³/min) at a run speed of 3 m/min.

The glass transition temperatures $Tg_1$ and $Tg_2$ of the two polymers used above were equal to about +50° C. and −95° C. respectively (822-2 DSC instrument from Mettler Toledo; helium atmosphere; specimens preheated from room temperature (20° C.) to 100° C. (at 20° C./min) and then rapidly cooled down to −140° C., before finally recording the DSC curve from −140° C. to +250° C. at 20° C./min).

After this second sheathing operation, the assembly (doubly-sheathed composite reinforcement) underwent a thermo-oxidative treatment for a time of about 100 s, by passing it through a tunnel oven at 3 m/min in an ambient atmosphere, heated to a temperature of 270° C. This final stage of the manufacture resulted in a composite reinforcement according to the invention, consisting of the initial steel cord sheathed with its polyamide first layer and with its SBS elastomer second layer. The composite reinforcement according to the invention produced in this way (the reinforcement R-2 as shown schematically in FIG. 2) had a final total diameter of about 1.1 mm.

To determine the best operating conditions for the thermo-oxidative treatment in the above trial, a range of temperatures from 160° C. to 280° C., for four treatment times (50 s, 100 s, 200 s and 400 s), was examined beforehand.

Trial 2—Adhesion Tests

The quality of the bond between the rubber and the composite reinforcements manufactured above was then assessed by a test in which the force needed to extract the reinforcements from a vulcanized rubber composition, also called a vulcanizate, was measured. This rubber composition was a conventional composition used for the calendering of metal tire belt plies, based on natural rubber, carbon black and standard additives.

The vulcanizate was a rubber block consisting of two sheaths measuring 200 mm by 4.5 mm and with a thickness of 3.5 mm, applied against each other before curing (the thickness of the resulting block was then 7 mm). It was during the conduction of this block that the composite reinforcements (15 strands in total) were imprisoned between the two rubber sheets in the uncured state, an equal distance apart and with one end of each composite reinforcement projecting on either side of these sheets an amount sufficient for the subsequent tensile test. The block containing the reinforcements was then placed in a suitable mould and then cured under pressure. The curing temperature and the curing time, left to the discretion of a person skilled in the art, were adapted to the intended test conditions. For example, in the present case, the block was cured at 160° C. for 15 minutes under a pressure of 16 bar.

After being cured, the specimen, thus consisting of the vulcanized block and the 15 reinforcements, was placed between the jaws of a suitable tensile testing machine so as to pull each reinforcement individually out of the rubber, at a given pull rate and a given temperature (for example, in the present case, at 50 mm/min and 20° C. respectively). The adhesion levels were characterized by measuring the pull-out force (denoted by $F_{max}$) for pulling the reinforcements out of the specimen (this being an average over 15 tensile tests).

It was found that the composite reinforcement of the invention, despite the fact that it contains no RFL adhesive (or any other adhesive), had a high pull-out force $F_{max}$ equal to about 60% of the control pull-out force measured on the nylon-sheathed control composite reinforcement (R-5) and bonded using a conventional RFL adhesive.

Under the same conditions, the control composite reinforcement (R-5) sheathed with nylon but containing no RFL adhesive (or any other adhesive), showed no adhesion to the rubber (practically zero pull-out force).

The result obtained on the composite reinforcement of the invention is, to a person skilled in the art, both remarkable and unexpected, especially as, before the thermo-oxidative treatment, the pull-out force of the same composite reinforcement proved too to be practically equal to zero.

Additional trials have also demonstrated that the use of the unsaturated TPS elastomer (SBS), not as the second sheathing layer but as adhesive incorporated into the rubber calendering composition (and therefore always in contact with the composite reinforcement) provided no adhesive contribution.

Consequently, the composite reinforcement of the invention, owing to its self-adhesive character, constitutes a useful and entirely credible alternative, on account of the adhesion levels obtained, to the composite reinforcements of the prior art that are sheathed with a thermoplastic material such as a polyamide or polyester which require, as is known, the use of an RFL adhesive to ensure that they adhere to the rubber.

The invention claimed is:

1. A composite reinforcement comprising:
   at least one reinforcing thread;
   a first layer of a thermoplastic polymer, the glass transition temperature of which is positive, covering said thread; and
   a second layer comprising an unsaturated thermoplastic styrene elastomer, the glass transition temperature of which is negative, covering the first layer; wherein the unsaturated thermoplastic styrene elastomer of the second layer is crosslinked.

2. The reinforcement according to claim 1, wherein the glass transition temperature of the thermoplastic polymer is above +20° C.

3. The reinforcement according to claim 1, wherein the glass transition temperature of the unsaturated thermoplastic styrene elastomer is below −20° C.

4. The reinforcement according to claim 1, wherein the difference in glass transition temperature between the thermoplastic polymer and the unsaturated thermoplastic styrene elastomer is greater than 60° C.

5. The reinforcement according to claim 1, wherein the thermoplastic polymer is an aliphatic polyamide or a polyester.

6. The reinforcement according to claim 5, wherein the thermoplastic polymer is a 6,6 polyamide.

7. The reinforcement according to claim 1, wherein the thermoplastic elastomer is a copolymer comprising styrene blocks and diene blocks.

8. The reinforcement according to claim 7, wherein the diene blocks are isoprene or butadiene blocks.

9. The reinforcement according to claim 8, wherein the thermoplastic elastomer is chosen within the group consisting of styrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS), styrene/butadiene/isoprene/styrene (SBIS) block copolymers and blends of these copolymers.

10. The reinforcement according to claim 9, wherein the thermoplastic elastomer is an SBS or SIS copolymer.

11. The reinforcement according to claim 1, wherein the thermoplastic elastomer comprises between 5 and 50% styrene by weight.

12. The reinforcement according to claim 1, wherein the minimum thickness of the first layer is between 1 µm and 2 µm.

13. The reinforcement according to claim 1, wherein the minimum thickness of the second layer is between 1 µm and 2 µm.

14. The reinforcement according to claim 1, wherein the minimum thickness of the second layer lies in the range from 0.02 µm to 1 µm.

15. The reinforcement according to claim 1, wherein the reinforcing thread is a metal wire.

16. The reinforcement according to claim 15, wherein the metal wire is a carbon steel wire.

17. A reinforcement article or semi-finished product comprising the composite reinforcement according to claim 1.

18. A pneumatic tire comprising a composite reinforcement according to claim 1.

19. A process for manufacturing a composite reinforcement according to claim 1, capable of adhering to a diene rubber matrix, comprising the steps of:
   the reinforcing thread is covered by a layer of the thermoplastic polymer having a positive glass transition temperature;
   a second layer comprising the unsaturated thermoplastic styrene elastomer, having a negative glass transition temperature, is deposited on the thread thus covered; and
   the assembly undergoes a thermo-oxidative treatment in order to bond the two layers together.

20. The process according to claim 19, wherein the glass transition temperature of the thermoplastic polymer is above +20° C.

21. The process according to claim 19, wherein the glass transition temperature of the unsaturated thermoplastic styrene elastomer is below −20° C.

22. The process according to claim 19, wherein the difference in glass transition temperature between the thermoplastic polymer and the unsaturated thermoplastic styrene elastomer is greater than 60° C.

23. The process according to claim 19, wherein the thermoplastic polymer is an aliphatic polyamide or a polyester.

24. The process according to claim 19, wherein the thermoplastic elastomer is a copolymer comprising styrene blocks and diene blocks.

25. The process according to claim 24, wherein the thermoplastic elastomer is chosen within the group consisting of styrene/butadiene (SB), styrene/isoprene (SI), styrene/butadiene/butylene (SBB), styrene/butadiene/isoprene (SBI), styrene/butadiene/styrene (SBS), styrene/ butadiene/butylene/styrene (SBBS), styrene/isoprene/styrene (SIS), styrene/butadiene/ isoprene/styrene (SBIS) block copolymers and blends of these copolymers.

26. The process according to claim 25, wherein the thermoplastic elastomer is an SBS or SIS copolymer.

27. The process according to claim 25, wherein the thermoplastic elastomer is an SBS copolymer.

* * * * *